(12) United States Patent
Kim et al.

(10) Patent No.: US 10,824,947 B2
(45) Date of Patent: Nov. 3, 2020

(54) LEARNING METHOD FOR SUPPORTING SAFER AUTONOMOUS DRIVING WITHOUT DANGER OF ACCIDENT BY ESTIMATING MOTIONS OF SURROUNDING OBJECTS THROUGH FUSION OF INFORMATION FROM MULTIPLE SOURCES, LEARNING DEVICE, TESTING METHOD AND TESTING DEVICE USING THE SAME

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 16/738,680

(22) Filed: Jan. 9, 2020

(65) Prior Publication Data
US 2020/0250541 A1 Aug. 6, 2020

Related U.S. Application Data

(60) Provisional application No. 62/799,315, filed on Jan. 31, 2019.

(51) Int. Cl.
*G06N 20/10* (2019.01)
*G06N 3/08* (2006.01)
(Continued)

(52) U.S. Cl.
CPC ............ *G06N 3/084* (2013.01); *B60W 50/00* (2013.01); *B60W 60/00* (2020.02);
(Continued)

(58) Field of Classification Search
CPC ........ G06N 3/084; G06N 20/20; G06N 20/10; B60W 60/00; B60W 50/00; G05D 1/0088; G06K 9/6262
See application file for complete search history.

(56) References Cited

U.S. PATENT DOCUMENTS 10,106,153 B1 * 10/2018 Xiao .................. G06K 9/00805

OTHER PUBLICATIONS

Maalej et al, VANETs Meet Autonomous Vehicles: A Multimodal 3D Environment Learning Approach, May 24, 2017, arxiv.org (Year: 2017).*

(Continued)

*Primary Examiner* — Austin Hicks
(74) *Attorney, Agent, or Firm* — Husch Blackwell LLP

(57) ABSTRACT

A learning method for supporting a safer autonomous driving through a fusion of information acquired from images and communications is provided. And the method includes steps of: (a) a learning device instructing a first neural network and a second neural network to generate an image-based feature map and a communication-based feature map by using a circumstance image and circumstance communication information; (b) the learning device instructing a (Continued)

third neural network to apply a third neural network operation to the image-based feature map and the communication-based feature map to generate an integrated feature map; (c) the learning device instructing a fourth neural network to apply a fourth neural network operation to the integrated feature map to generate estimated surrounding motion information; and (d) the learning device instructing a first loss layer to train parameters of the first to the fourth neural networks.

30 Claims, 6 Drawing Sheets

(51) Int. Cl.
*G06N 3/04* (2006.01)
*G06N 20/20* (2019.01)
*G06K 9/62* (2006.01)
*G05D 1/00* (2006.01)
*B60W 60/00* (2020.01)
*B60W 50/00* (2006.01)

(52) U.S. Cl.
CPC ......... *G05D 1/0088* (2013.01); *G06K 9/6262* (2013.01); *G06K 9/6289* (2013.01); *G06N 3/0454* (2013.01); *G06N 20/10* (2019.01); *G06N 20/20* (2019.01); *B60W 2050/0004* (2013.01); *B60W 2420/42* (2013.01)

(56) References Cited

OTHER PUBLICATIONS

Stradvision, Autonomous Driving AI SVNet A Deep-Learning-Based Perception for ADAS and Autonomous Driving, as early as Jul. 13, 2020 (Year: 2020).*

Xie, Han, Yunfan Chen, and Hyunchul Shin. "Context-aware pedestrian detection especially for small-sized instances with Deconvolution Integrated Faster RCNN (DIF R-CNN)." Applied Intelligence 49.3 (2019): 1200-1211.

Guo, Aixin, et al. "Pedestrian detection via multi-scale feature fusion convolutional neural network." 2017 Chinese Automation Congress (CAC). IEEE, 2017.

Du, Xianzhi, et al. "Fused deep neural networks for efficient pedestrian detection." arXiv preprint arXiv:1805.08688 (2018).

* cited by examiner

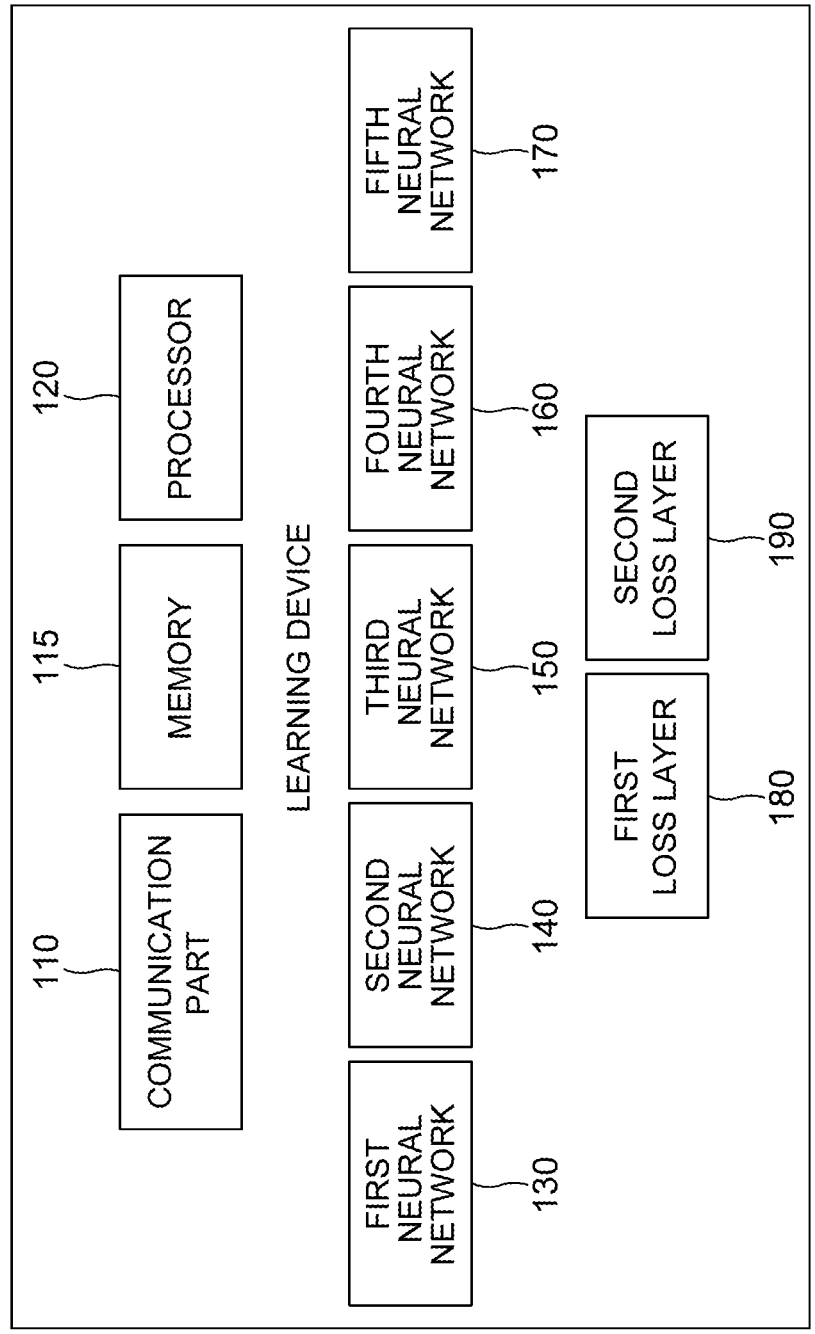

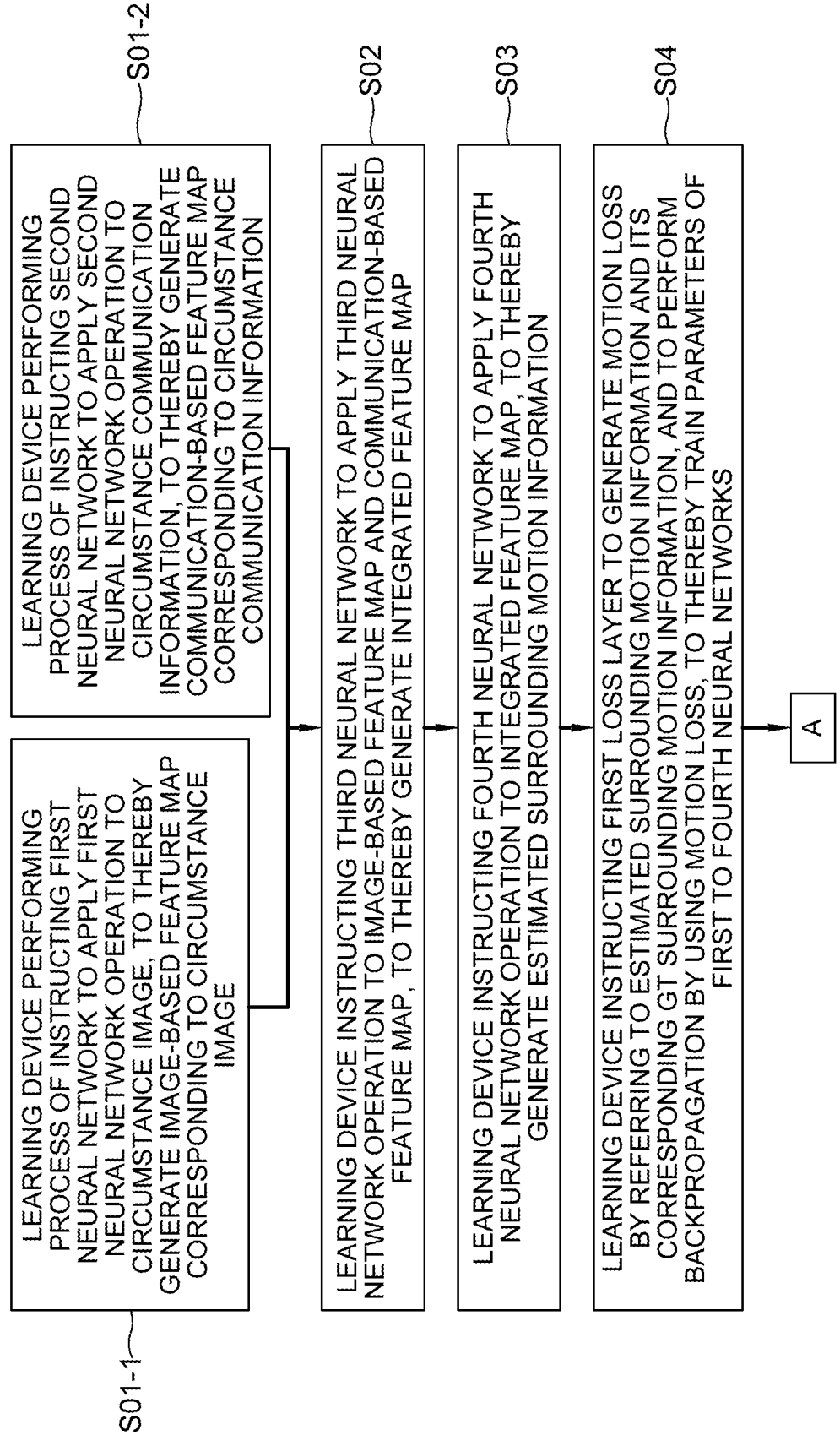

LEARNING METHOD FOR SUPPORTING SAFER AUTONOMOUS DRIVING WITHOUT DANGER OF ACCIDENT BY ESTIMATING MOTIONS OF SURROUNDING OBJECTS THROUGH FUSION OF INFORMATION FROM MULTIPLE SOURCES, LEARNING DEVICE, TESTING METHOD AND TESTING DEVICE USING THE SAME

CROSS REFERENCE OF RELATED APPLICATION

This application claims the benefit of priority to U.S. Provisional Patent Application No. 62/799,315, filed Jan. 31, 2019, the entire contents of which are incorporated herein by reference.

FIELD OF THE DISCLOSURE

The present disclosure relates to a method and a device for use with an autonomous vehicle; and more particularly, to a learning method for supporting a safer autonomous driving without danger of accident by estimating motions of surrounding objects through a fusion of information from multiple sources, a learning device, a testing method, and a testing device using the same.

BACKGROUND OF THE DISCLOSURE

Recently, automobile safety supporting system and autonomous driving system have been developed rapidly, and collaborative driving technology, which is an intelligent automobile service technology, has been proposed.

The conventional collaborative driving technology is classified into three types of technologies according to levels of collaboration among vehicles. The first one is autonomous driving technology centering on individual vehicles, the second one is convoy technology, and the last one is vehicle platooning technology.

The convoy technology is performed by maintaining movement patterns and formations of the vehicles. In the convoy technology, drivers drive their vehicles without a leading vehicle. Likewise, the vehicle platooning technology is also performed by maintaining movement patterns and same formations of the vehicles. However, the vehicle platooning technology includes at least one leading vehicle and at least one following vehicle. Herein, the following vehicle is controlled according to the operation of the leading vehicle, without control of its driver.

That is, during the vehicle platooning, autonomous vehicles may drive safely while maintaining distances between themselves by the aid of at least one leading vehicle capable of controlling steering, accelerators, and brakes of following vehicles.

The vehicle platooning may have many advantages. For example, the vehicles can improve fuel efficiencies with lower air resistance and thereby reduce the exhaust emission. Further, the multiple vehicles may comply with traffic regulations and thereby there may be increasing efficiency of road management.

Meanwhile, the autonomous vehicles may drive in company with other autonomous vehicles and/or non-autonomous vehicles on the road. That is, the autonomous vehicles may change its mode to semi-autonomous driving mode, autonomous driving mode and drivers' driving mode according to road conditions, drivers' conditions, etc.

Thus, in the conventional vehicle platooning technology, in case a traffic accident happens on the road where the autonomous vehicles are driving, additional accidents may be incurred if the autonomous vehicles fail to react properly.

SUMMARY OF THE DISCLOSURE

It is an object of the present disclosure to solve all the aforementioned problems.

It is another object of the present disclosure to allow autonomous vehicles to react properly when they meet at least one accident during vehicle platooning.

It is still yet another object of the present disclosure to allow the autonomous vehicles to avoid one or more surrounding objects with high accident hazard.

In accordance with one aspect of the present disclosure, there is provided a learning method for supporting a safer autonomous driving, avoiding dangers of accidents, by estimating one or more motions of one or more surrounding objects using a fusion of each of pieces of information acquired through images and communications, including steps of: (a) a learning device performing a process of instructing, if at least one circumstance image is acquired through at least one camera on a subject vehicle, a first neural network to apply at least one first neural network operation to the circumstance image, to thereby generate at least one image-based feature map corresponding to the circumstance image, and a process of instructing, if circumstance communication information is acquired through at least one communication module on the subject vehicle, a second neural network to apply at least one second neural network operation to the circumstance communication information, to thereby generate at least one communication-based feature map corresponding to the circumstance communication information; (b) the learning device instructing a third neural network to apply at least one third neural network operation to the image-based feature map and the communication-based feature map, to thereby generate an integrated feature map; (c) the learning device instructing a fourth neural network to apply at least one fourth neural network operation to the integrated feature map, to thereby generate estimated surrounding motion information which represents estimated motions of the surrounding objects during a specific time range; and (d) the learning device instructing a first loss layer to generate at least one motion loss by referring to the estimated surrounding motion information and its corresponding Ground-Truth (GT) surrounding motion information, and to perform backpropagation by using the motion loss, to thereby train at least part of parameters of the first to the fourth neural networks.

As one example, at the step of (a), the learning device (i) instructs at least one second Fully-Connected (FC) layer in the second neural network to apply at least one second FC operation to the circumstance communication information including communication-based meta data on each of the surrounding objects located closer than a threshold from the subject vehicle as its one or more communication-based meta data vectors, to thereby generate communication-based meta feature vectors corresponding to the communication-based meta data vectors, and (ii) instructs at least one second pooling layer therein to apply at least one second pooling operation to the communication-based meta feature vectors, to thereby generate the communication-based feature map.

As one example, at the step of (c), the learning device instructs the fourth neural network to apply the fourth neural network operation to (i) the integrated feature map corresponding to global information acquired through the camera and the communication module and (ii) a meta feature map, corresponding to local information on each of the surrounding objects, including one or more communication-based meta feature vectors which have been used for generating the communication-based feature map, to thereby generate the estimated surrounding motion information.

As one example, at the step of (c), the learning device generates the meta feature map by referring to the communication-based meta feature vectors and one or more image-based meta feature vectors corresponding to image-based meta data on the surrounding objects acquired through the camera.

As one example, at the step of (b), the learning device generates a temporary feature map by channel-wise concatenating the communication-based feature map and the image-based feature map, and instructs the third neural network, built as a Recurrent Neural Network (RNN), to apply the third neural network operation to the temporary feature map by using a state vector corresponding to its previously inputted information, to thereby generate the integrated feature map.

As one example, the third neural network is built as a Long-Short Term Memory (LSTM) network which is one kind of the RNN.

As one example, the learning device instructs the first loss layer to generate the motion loss by referring to (i) the GT surrounding motion information acquired by referring to location information and velocity information of the surrounding objects at a (T+1)-th timing, if the circumstance image and the circumstance communication information correspond to a T-th timing before the (T+1)-th timing, and (ii) the estimated surrounding motion information.

As one example, the method of claim 1, further includes steps of: (e) the learning device, on condition that the first to the fourth neural networks have been trained, instructing a fifth neural network to apply at least one fifth neural network operation to estimated surrounding motion information outputted from the trained fourth neural network, to thereby generate estimated danger information including information on a probability of an accident, occurring during the specific time range, whose correlation score with the subject vehicle is larger than a threshold; and (f) the learning device instructing a second loss layer to generate at least one danger loss by referring to the estimated danger information and its corresponding GT danger information, and to perform backpropagation by using the danger loss, to thereby train at least part of parameters of the fifth neural network.

As one example, at the step of (a), the learning device instructs a first convolutional layer in the first neural network to apply at least one first convolutional operation to the circumstance image, to thereby generate at least one first feature map, instructs a first pooling layer therein to apply at least one first pooling operation to the first feature map, to thereby generate at least one first pooled feature map, and instructs a first FC layer therein to apply at least one first FC operation to the first pooled feature map, to thereby generate the image-based feature map.

In accordance with another aspect of the present disclosure, there is provided a testing method for supporting a safer autonomous driving, avoiding dangers of accidents, by estimating one or more motions of one or more surrounding objects for testing using a fusion of each of pieces of information acquired through images and communications, including steps of: (a) on condition that (1) a learning device has performed a process of instructing, if at least one circumstance image for training is acquired through at least one camera for training on a subject vehicle for training, a first neural network to apply at least one first neural network operation to the circumstance image for training, to thereby generate at least one image-based feature map for training corresponding to the circumstance image for training, and a process of instructing, if circumstance communication information for training is acquired through at least one communication module for training on the subject vehicle for training, a second neural network to apply at least one second neural network operation to the circumstance communication information for training, to thereby generate at least one communication-based feature map for training corresponding to the circumstance communication information for training; (2) the learning device has instructed a third neural network to apply at least one third neural network operation to the image-based feature map for training and the communication-based feature map for training, to thereby generate an integrated feature map for training; (3) the learning device has instructed a fourth neural network to apply at least one fourth neural network operation to the integrated feature map for training, to thereby generate estimated surrounding motion information for training which represents estimated motions of one or more surrounding objects for training during a specific time range; and (4) the learning device has instructed a first loss layer to generate at least one motion loss by referring to the estimated surrounding motion information for training and its corresponding Ground-Truth (GT) surrounding motion information, and to perform backpropagation by using the motion loss, to thereby train at least part of parameters of the first to the fourth neural networks, a testing device performing a process of instructing, if at least one circumstance image for testing is acquired through at least one camera for testing on a subject vehicle for testing, the first neural network to apply the first neural network operation to the circumstance image for testing, to thereby generate at least one image-based feature map for testing corresponding to the circumstance image for testing, and a process of instructing, if circumstance communication information for testing is acquired through at least one communication module for testing on the subject vehicle for testing, the second neural network to apply the second neural network operation to the circumstance communication information for testing, to thereby generate at least one communication-based feature map for testing corresponding to the circumstance communication information for testing; (b) the testing device instructing the third neural network to apply the third neural network operation to the image-based feature map for testing and the communication-based feature map for testing, to thereby generate an integrated feature map for testing; (c) the testing device instructing the fourth neural network to apply the fourth neural network operation to the integrated feature map for testing, to thereby generate estimated surrounding motion information for testing which represents estimated motions of the surrounding objects for testing during the specific time range.

As one example, the method of claim 10, further includes a step of: (d) the testing device instructing a fifth neural network which has been trained by using the first to the fourth neural networks to apply at least one fifth neural network operation to the estimated surrounding motion information for testing, to thereby generate estimated danger information for testing including information on a probability of an accident, occurring during the specific time range, whose correlation score with the subject vehicle for testing is larger than a threshold.

As one example, the method further includes a step of: (e) the testing device, if the subject vehicle for testing is performing the autonomous driving through a platoon driving, adjusting platoon driving parameters by referring to the estimated danger information for testing.

As one example, the testing device, if a specific accident whose correlation score with the subject vehicle for testing is larger than the threshold actually occurs and is detected, shares information on the specific accident with the surrounding objects for testing, and supports the subject vehicle for testing to perform the autonomous driving by referring to a driving strategy for avoiding a hazardous situation to be occurred by the specific accident.

As one example, at the step of (c), the testing device instructs the fourth neural network to apply the fourth neural network operation to (i) the integrated feature map for testing corresponding to global information for testing acquired through the camera for testing and the communication module for testing and (ii) a meta feature map, for testing corresponding to local information for testing on each of the surrounding objects for testing, including one or more communication-based meta feature vectors for testing which have been used for generating the communication-based feature map for testing, to thereby generate the estimated surrounding motion information for testing.

As one example, at the step of (c), the testing device generates the meta feature map for testing by referring to the communication-based meta feature vectors for testing and one or more image-based meta feature vectors for testing corresponding to image-based meta data for testing on the surrounding objects for testing acquired through the camera for testing.

In accordance with another aspect of the present disclosure, there is provided a learning device for supporting a safer autonomous driving, avoiding dangers of accidents, by estimating one or more motions of one or more surrounding objects using a fusion of each of pieces of information acquired through images and communications, including: at least one memory that stores instructions; and at least one processor configured to execute the instructions to perform processes of: (I) instructing, if at least one circumstance image is acquired through at least one camera on a subject vehicle, a first neural network to apply at least one first neural network operation to the circumstance image, to thereby generate at least one image-based feature map corresponding to the circumstance image, and instructing, if circumstance communication information is acquired through at least one communication module on the subject vehicle, a second neural network to apply at least one second neural network operation to the circumstance communication information, to thereby generate at least one communication-based feature map corresponding to the circumstance communication information; (II) instructing a third neural network to apply at least one third neural network operation to the image-based feature map and the communication-based feature map, to thereby generate an integrated feature map; (III) instructing a fourth neural network to apply at least one fourth neural network operation to the integrated feature map, to thereby generate estimated surrounding motion information which represents estimated motions of the surrounding objects during a specific time range; and (IV) instructing a first loss layer to generate at least one motion loss by referring to the estimated surrounding motion information and its corresponding Ground-Truth (GT) surrounding motion information, and to perform backpropagation by using the motion loss, to thereby train at least part of parameters of the first to the fourth neural networks.

As one example, at the process of (I), the processor (i) instructs at least one second Fully-Connected (FC) layer in the second neural network to apply at least one second FC operation to the circumstance communication information including communication-based meta data on each of the surrounding objects located closer than a threshold from the subject vehicle as its one or more communication-based meta data vectors, to thereby generate communication-based meta feature vectors corresponding to the communication-based meta data vectors, and (ii) instructs at least one second pooling layer therein to apply at least one second pooling operation to the communication-based meta feature vectors, to thereby generate the communication-based feature map.

As one example, at the process of (III), the processor instructs the fourth neural network to apply the fourth neural network operation to (i) the integrated feature map corresponding to global information acquired through the camera and the communication module and (ii) a meta feature map, corresponding to local information on each of the surrounding objects, including one or more communication-based meta feature vectors which have been used for generating the communication-based feature map, to thereby generate the estimated surrounding motion information.

As one example, at the process of (III), the processor generates the meta feature map by referring to the communication-based meta feature vectors and one or more image-based meta feature vectors corresponding to image-based meta data on the surrounding objects acquired through the camera.

As one example, at the process of (II), the processor generates a temporary feature map by channel-wise concatenating the communication-based feature map and the image-based feature map, and instructs the third neural network, built as a Recurrent Neural Network (RNN), to apply the third neural network operation to the temporary feature map by using a state vector corresponding to its previously inputted information, to thereby generate the integrated feature map.

As one example, the third neural network is built as a Long-Short Term Memory (LSTM) network which is one kind of the RNN.

As one example, the processor instructs the first loss layer to generate the motion loss by referring to (i) the GT surrounding motion information acquired by referring to location information and velocity information of the surrounding objects at a (T+1)-th timing, if the circumstance image and the circumstance communication information correspond to a T-th timing before the (T+1)-th timing, and (ii) the estimated surrounding motion information.

As one example, the processor further performs processes of (V) on condition that the first to the fourth neural networks have been trained, instructing a fifth neural network to apply at least one fifth neural network operation to estimated surrounding motion information outputted from the trained fourth neural network, to thereby generate estimated danger information including information on a probability of an accident, occurring during the specific time range, whose correlation score with the subject vehicle is larger than a threshold, and (VI) instructing a second loss layer to generate at least one danger loss by referring to the estimated danger information and its corresponding GT danger information, and to perform backpropagation by using the danger loss, to thereby train at least part of parameters of the fifth neural network.

As one example, at the process of (I), the processor instructs a first convolutional layer in the first neural network to apply at least one first convolutional operation to the circumstance image, to thereby generate at least one first feature map, instructs a first pooling layer therein to apply at least one first pooling operation to the first feature map, to thereby generate at least one first pooled feature map, and instructs a first FC layer therein to apply at least one first FC operation to the first pooled feature map, to thereby generate the image-based feature map.

In accordance with still yet another aspect of the present disclosure, there is provided a testing device for supporting a safer autonomous driving, avoiding dangers of accidents, by estimating one or more motions of one or more surrounding objects for testing using a fusion of each of pieces of information acquired through images and communications, including: at least one memory that stores instructions; and at least one processor configured to execute the instructions to perform processes of: (I) on condition that (1) a learning device has performed a process of instructing, if at least one circumstance image for training is acquired through at least one camera for training on a subject vehicle for training, a first neural network to apply at least one first neural network operation to the circumstance image for training, to thereby generate at least one image-based feature map for training corresponding to the circumstance image for training, and a process of instructing, if circumstance communication information for training is acquired through at least one communication module for training on the subject vehicle for training, a second neural network to apply at least one second neural network operation to the circumstance communication information for training, to thereby generate at least one communication-based feature map for training corresponding to the circumstance communication information for training; (2) the learning device has instructed a third neural network to apply at least one third neural network operation to the image-based feature map for training and the communication-based feature map for training, to thereby generate an integrated feature map for training; (3) the learning device has instructed a fourth neural network to apply at least one fourth neural network operation to the integrated feature map for training, to thereby generate estimated surrounding motion information for training which represents estimated motions of one or more surrounding objects for training during a specific time range; and (4) the learning device has instructed a first loss layer to generate at least one motion loss by referring to the estimated surrounding motion information for training and its corresponding Ground-Truth (GT) surrounding motion information, and to perform backpropagation by using the motion loss, to thereby train at least part of parameters of the first to the fourth neural networks, performing a process of instructing, if at least one circumstance image for testing is acquired through at least one camera for testing on a subject vehicle for testing, the first neural network to apply the first neural network operation to the circumstance image for testing, to thereby generate at least one image-based feature map for testing corresponding to the circumstance image for testing, and a process of instructing, if circumstance communication information for testing is acquired through at least one communication module for testing on the subject vehicle for testing, the second neural network to apply the second neural network operation to the circumstance communication information for testing, to thereby generate at least one communication-based feature map for testing corresponding to the circumstance communication information for testing; (II) instructing the third neural network to apply the third neural network operation to the image-based feature map for testing and the communication-based feature map for testing, to thereby generate an integrated feature map for testing; (III) instructing the fourth neural network to apply the fourth neural network operation to the integrated feature map for testing, to thereby generate estimated surrounding motion information for testing which represents estimated motions of the surrounding objects for testing during the specific time range.

As one example, the processor further performs a process of (IV) instructing a fifth neural network which has been trained by using the first to the fourth neural networks to apply at least one fifth neural network operation to the estimated surrounding motion information for testing, to thereby generate estimated danger information for testing including information on a probability of an accident, occurring during the specific time range, whose correlation score with the subject vehicle for testing is larger than a threshold.

As one example, the processor further performs a process of (V) if the subject vehicle for testing is performing the autonomous driving through a platoon driving, adjusting platoon driving parameters by referring to the estimated danger information for testing.

As one example, the processor, if a specific accident whose correlation score with the subject vehicle for testing is larger than the threshold actually occurs and is detected, shares information on the specific accident with the surrounding objects for testing, and supports the subject vehicle for testing to perform the autonomous driving by referring to a driving strategy for avoiding a hazardous situation to be occurred by the specific accident.

As one example, at the process of (III), the processor instructs the fourth neural network to apply the fourth neural network operation to (i) the integrated feature map for testing corresponding to global information for testing acquired through the camera for testing and the communication module for testing and (ii) a meta feature map, for testing corresponding to local information for testing on each of the surrounding objects for testing, including one or more communication-based meta feature vectors for testing which have been used for generating the communication-based feature map for testing, to thereby generate the estimated surrounding motion information for testing.

As one example, at the process of (III), the processor generates the meta feature map for testing by referring to the communication-based meta feature vectors for testing and one or more image-based meta feature vectors for testing corresponding to image-based meta data for testing on the surrounding objects for testing acquired through the camera for testing.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

FIG. 1 is a drawing schematically illustrating a configuration of a learning device for performing a learning method for supporting a safer autonomous driving without danger of accident by estimating motions of surrounding objects through a fusion of information from multiple sources in accordance with one example embodiment of the present disclosure.

FIGS. 2a and 2b are flow charts schematically illustrating the learning method for supporting the safer autonomous driving without the danger of the accident by estimating the motions of the surrounding objects through the fusion of the information from the multiple sources in accordance with one example embodiment of the present disclosure.

DETAILED DESCRIPTION OF THE PREFERRED EMBODIMENTS

Figure 2B:
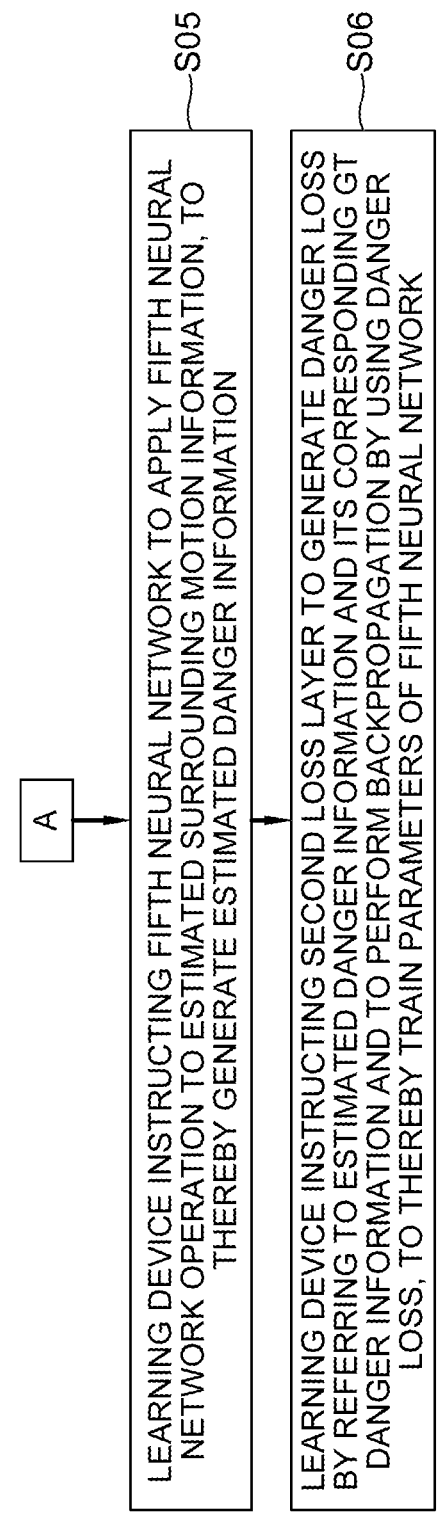

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating a configuration of a learning device for performing a learning method for supporting a safer autonomous driving without danger of accident by estimating motions of surrounding objects through a fusion of information from multiple sources in accordance with one example embodiment of the present disclosure.

By referring to FIG. 1, the learning device 100 may include first to fifth neural networks 130 to 170, and first to second loss layers 180 to 190, to be described later. Processes of input/output and computations of the first to the fifth neural networks 130 to 170, and the first to the second loss layers 180 to 190 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the learning device 100 does not exclude an integrated device including any combination of a processor, a memory, a medium, or any other computing components.

Herein, the first loss layer 180 and the second loss layer 190 may be a same entity, but for convenience on explanation, the two may be supposed to be distinguished in the below explanation.

So far the configuration of the learning device 100 has been explained. Hereinafter, the learning method itself will be explained more specifically. In order to explain a flow of the learning method, FIGS. 2A and 2B will be referred to.

FIGS. 2A and 2B are flow charts schematically illustrating the learning method for supporting the safer autonomous driving without the danger of the accident by estimating the motions of the surrounding objects through the fusion of the information from the multiple sources in accordance with one example embodiment of the present disclosure.

By referring to FIG. 2A, at a step of S01-1, the learning device 100 may perform a process of instructing the first neural network 130 to apply at least one first neural network operation to at least one circumstance image, to thereby generate at least one image-based feature map corresponding to the circumstance image. Also, at a step of S01-2, the learning device 100 may perform a process of instructing the second neural network 140 to apply at least one second neural network operation to circumstance communication information, to thereby generate at least one communication-based feature map corresponding to the circumstance communication information. The processes of the steps of S01-1 and S01-2 may be performed in parallel.

Thereafter, at a step of S02, the learning device 100 may instruct the third neural network 150 to apply at least one third neural network operation to the image-based feature map and the communication-based feature map, to thereby generate an integrated feature map. And, at a step of S03, the learning device 100 may instruct the fourth neural network 160 to apply at least one fourth neural network operation to the integrated feature map, to thereby generate estimated surrounding motion information. Herein, the estimated surrounding motion information may represent estimated motions of the surrounding objects during a specific time range. Further, at a step of S04, the learning device 100 may instruct the first loss layer 180 to generate at least one motion loss by referring to the estimated surrounding motion information and its corresponding Ground-Truth (GT) surrounding motion information, and to perform backpropagation by using the motion loss, to thereby train at least part of parameters of the first to the fourth neural networks 130 to 160. The "A"s at the end of FIG. 2A and the front of FIG. 2B are just a notation for showing continuity between processes in FIG. 2A and FIG. 2B, not a specific process.

After said at least part of the parameters are trained by repeating the steps of S01 to S04 according to FIG. 2A, as additional steps, at a step of S05, by referring to FIG. 2B, the learning device 100 may instruct the fifth neural network 170 to apply at least one fifth neural network operation to the estimated surrounding motion information outputted from the trained fourth neural network 160, to thereby generate estimated danger information. Then, at a step of S06, the learning device 100 may instruct the second loss layer 190 to generate at least one danger loss by referring to the estimated danger information and its corresponding GT danger information, and to perform backpropagation by using the danger loss, to thereby train at least part of parameters of the fifth neural network 170.

So far the flow of the learning method has been explained briefly. Below, it will be explained more specifically.

First, the learning device 100 may acquire the at least one circumstance image through at least one camera on the subject vehicle and the circumstance communication information through at least one communication module on the subject vehicle. Herein, the circumstance image may be a result of the camera photographing surroundings of the subject vehicle, and the circumstance communication information may be information, including meta data of the surrounding objects located closer than a first threshold from the subject vehicle and connected with the subject vehicle through V2X communications, transmitted from the surrounding objects. After the circumstance image and the circumstance communication information are acquired, the learning device 100 may instruct the first and the second neural networks 130 and 140 to process the circumstance image and the circumstance communication information, to thereby generate the image-based feature map and the communication-based feature map.

Herein, the first neural network 130 may include at least one first convolutional layer, at least one first pooling layer and at least one Fully-Connected (FC) layer. That is, the learning device 100 may instruct the first convolutional layer to apply at least one first convolutional operation to the circumstance image, to thereby generate at least one first feature map. Then, the learning device 100 may instruct the first pooling layer to apply at least one first pooling operation to the first feature map, to thereby generate at least one first pooled feature map. Thereafter, the learning device 100 may instruct the first FC layer to apply at least one first FC operation to the first pooled feature map, to thereby generate the image-based feature map. Such a configuration of the first neural network 130 is not essential, thus any configuration capable of extracting a feature map from its inputted image may be used for the first neural network 130.

Otherwise, the second neural network 140 may include at least one second FC layer and at least one second pooling layer. That is, the learning device 100 may instruct the second FC layer to apply at least one second FC operation to the circumstance communication information including communication-based meta data on each of the surrounding objects located closer than the first threshold from the subject vehicle as its one or more communication-based meta data vectors, to thereby generate communication-based meta feature vectors corresponding to the communication-based meta data vectors. Then, the learning device 100 may instruct the second pooling layer to apply at least one second pooling operation to the communication-based meta feature vectors, to thereby generate the communication-based feature map.

Herein, if general information on an overall scene around the subject vehicle is noted as "global information" and detailed information on each of the surrounding objects in said overall scene is noted as "local information", the image-based and the communication-based feature maps may be considered as including the global information, since the image-based feature map has been generated by processing the circumstance image including the overall scene, and the communication-based feature map has been generated by pooling the communication-based meta data vectors for each of the surrounding objects. Comparing to this, the communication-based meta data vectors may be considered as including the local information. To be explained later, such two kinds of information, i.e., the global information and the local information, may be used together to support the subject vehicle to estimate motions thereof around. However, an embodiment of using only the global information is possible too. Hereinafter, how to integrate (i) the communication-based feature map including a part of the global information acquired through the V2X communications and (ii) the image-based feature map including another part of the global information acquired through the camera, to thereby generate the integrated feature map on which more plentiful global information is reflected, will be explained.

That is, the learning device 100 may instruct the third neural network 150 to generate the integrated feature map by applying the third neural network operation to the image-based feature map and the communication-based feature map. Herein, the third neural network 150 may be built as a Recurrent Neural Network (RNN). More specifically, the third neural network may be built as a Long-Short Term Memory (LSTM) network which is one kind of the RNN. For more detailed explanation on how the integrated feature map is generated, FIG. 3 will be referred to.

Figure 3:
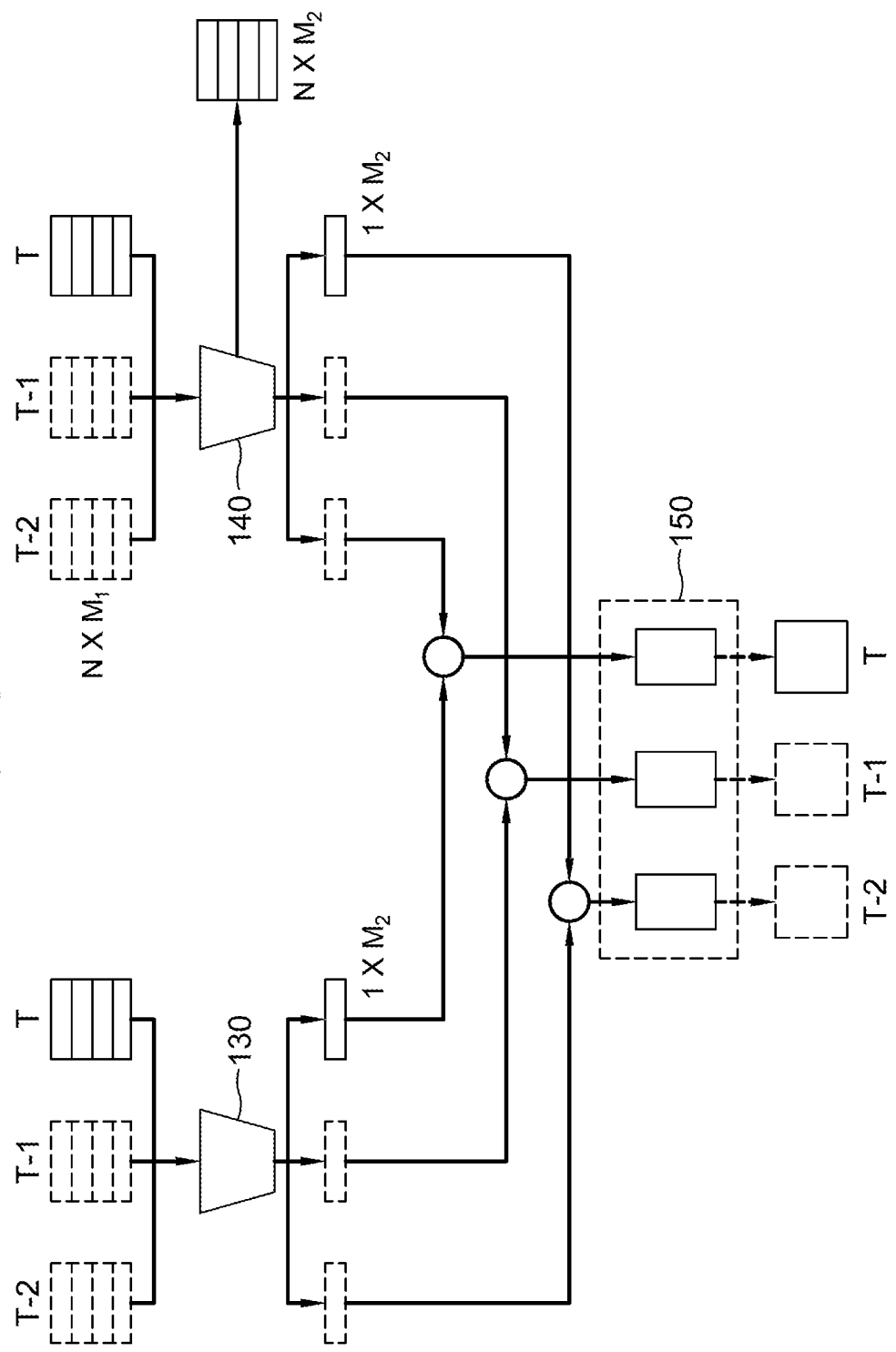
FIG. 3 is a drawing schematically illustrating how an integrated feature map is generated, wherein the integrated feature map is used for performing the learning method for supporting the safer autonomous driving without the danger of the accident by estimating the motions of the surrounding objects through the fusion of the information from the multiple sources in accordance with one example embodiment of the present disclosure.

FIG. 3 is a drawing schematically illustrating how an integrated feature map is generated, wherein the integrated feature map is used for performing the learning method for supporting the safer autonomous driving without the danger of the accident by estimating the motions of the surrounding objects through the fusion of the information from the multiple sources in accordance with one example embodiment of the present disclosure.

By referring to FIG. 3, the learning device 100 may channel-wise concatenating the image-based feature map with a size of 1×$M_2$ and the communication-based feature map with a size of 1×$M_2$ to thereby generate a temporary feature map, and may instruct the third neural network 150 built as the LSTM network to apply the third neural network operation to the temporary feature map by using a state vector corresponding to its previously inputted information, to thereby generate the integrated feature map. In FIG. 3, some parts illustrated with solid lines denote an image-based feature map, a communication-based feature map, a temporary feature map and an integrated feature map generated at a current timing, i.e., a T-th timing, and the other parts illustrated with dotted lines denote image-based feature maps, communication-based feature maps, temporary feature maps and integrated feature maps generated at past timings, i.e., a (T-1)-th timing and a (T-2)-th timing. The third neural network 150 may update the status vector while processing its inputted temporary feature maps to generate the integrated feature map at each of the timings. Since such a status vector, updated at the past (T-2) and (T-1) timings, is used when processing the temporary feature map of the current T-th timing, it can be said that information from the past is reflected on the process of generating the integrated feature map. Such usage of using the status vector is well-known to a person in the art, thus a further explanation is omitted.

In the FIG. 3, shown is an output matrix with a size of N×$M_2$, outputted from the second neural network 140. The output matrix includes N number of image-based meta feature vectors, corresponding to the circumstance communication information included in an input matrix with a size of N×$M_1$, to be explained below, while generating the image-based feature map. Such image-based meta feature vectors will be explained later.

After the integrated feature map is generated, the learning device 100 may instruct the fourth neural network 160 to apply the fourth neural network operation to the integrated feature map corresponding to global information acquired through the camera and the communication module to thereby generate the estimated surrounding motion information. The fourth neural network may include at least part of a convolutional layer, a pooling layer and an FC layer, and the fourth neural network operation may be an operation using at least part of those layers.

Hereinafter, different from the above embodiment using only the global information, another embodiment using the global information and the local information together will be explained.

That is, the learning device 100 may instruct the fourth neural network 160 to apply the fourth neural network operation to (i) the integrated feature map corresponding to the global information acquired through the camera and the communication module and (ii) a meta feature map, corresponding to the local information on each of the surrounding objects, including one or more meta feature vectors which have been used for generating the communication-based feature map as its column vectors, to thereby generate the estimated surrounding motion information. Specifically, the meta feature map may have been generated by (i) gathering the communication-based meta feature vectors, and (ii) formulating a matrix using the gathered communication-based meta feature vectors. In this embodiment, only some part of the local information acquired from the V2X communications is reflected on the meta feature map.

Different from the above embodiment, there is another embodiment in which another part of the local information, acquired from the camera, along with said some part of the local information are reflected on the meta feature map. That is, the learning device 100 may generate image-based meta data on the surrounding objects by applying an object detection to the circumstance image, and then generate the meta feature map by further using said one or more image-based meta feature vectors generated by processing the image-based meta data. As one example, the image-based meta feature vectors may include each of pieces of the image-based meta data as its components. Otherwise, each of individual images including each of the surrounding objects other than the circumstance image may be processed to generate the image-based meta feature vectors, and the image-based meta feature vectors may be used for generating the meta feature map.

After the estimated surrounding motion information is generated by using at least one of the embodiments, the learning device 100 may train the first to the fifth neural network 130 to 170 by using the estimated surrounding motion information. Herein, there are multiple embodiments for training the first to the fifth neural networks 130 to 170, thus each of the embodiments will be explained in order.

First, as said before, the first to the third neural networks 130 to 150 are used for generating the integrated feature map on which the global information is reflected, and the fourth neural network 160 is used for generating the estimated surrounding motion information by using the integrated feature map. Comparing to those neural networks, the fifth neural network 170 may be used for generating the estimated danger information by referring to the estimated surrounding motion information. On this basis, according to an example embodiment, the learning device 100 may train at least part of the parameters of the first to the fourth neural networks 130 to 160 by using the first loss layer 180. By repeating such processes, the parameters thereof may be fully trained, and the first to the fourth neural networks 130 to 160 may be used for training the fifth neural network 170. In order to explain such example embodiment, FIG. 4 will be referred to.

Figure 4:
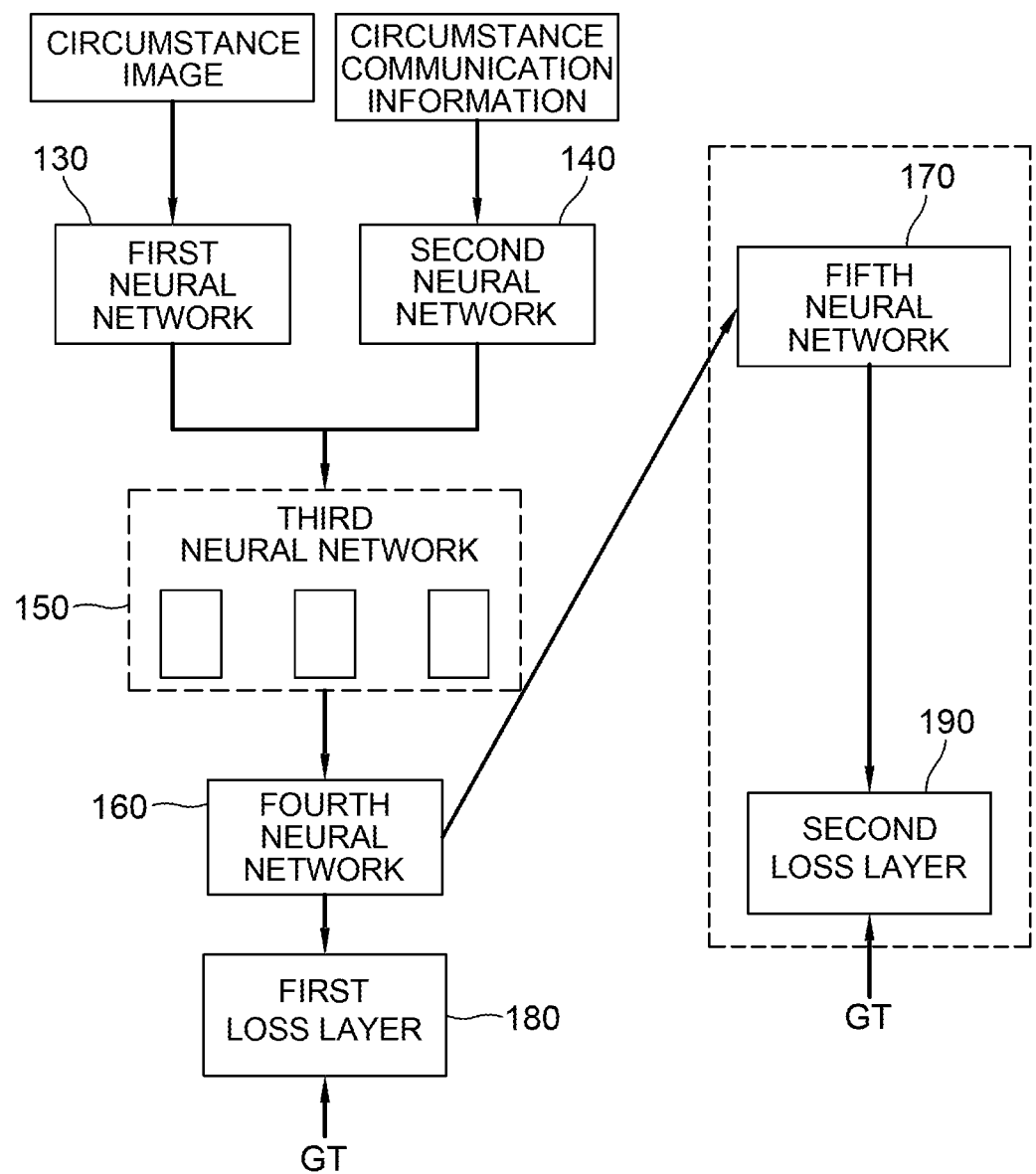
FIG. 4 is a drawing schematically illustrating how first to fifth neural networks are trained, wherein the neural networks are used for performing the learning method for supporting the safer autonomous driving without the danger of the accident by estimating the motions of the surrounding objects through the fusion of the information from the multiple sources in accordance with one example embodiment of the present disclosure.

FIG. 4 is a drawing schematically illustrating how the first to the fifth neural networks are trained, wherein the neural networks are used for performing the learning method for supporting the safer autonomous driving without the danger of the accident by estimating the motions of the surrounding objects through the fusion of the information from the multiple sources in accordance with one example embodiment of the present disclosure.

By referring to FIG. 4, if the estimated surrounding motion information is acquired, the learning device 100 may instruct the first loss layer 180 to generate the motion loss by referring to the estimated surrounding motion information and its corresponding GT surrounding motion information, and to perform backpropagation by using the motion loss, to thereby train at least part of the parameters of the first to the fourth neural networks 130 to 160. Herein, the GT surrounding motion information may have been generated by referring to location information and velocity information of the surrounding objects at a (T+1)-th timing, if the circumstance image and the circumstance communication information correspond to a T-th timing before the (T+1)-th timing.

After said at least part of the parameters of the first to the fourth neural networks 130 to 160 are trained, the learning device 100 may instruct the fifth neural network 170 to apply the fifth neural network operation to estimated surrounding motion information outputted from the trained fourth neural network 160, to thereby generate estimated danger information including information on a probability of an accident, occurring during the specific time range, whose correlation score with the subject vehicle is larger than a second threshold. For example, the correlation score may be calculated by using a distance between a location where the accident occurred and a location of the subject vehicle at that time. However, a scope of the present disclosure may not be limited thereto.

Then, the learning device 100 may instruct the second loss layer 190 to generate the danger loss by referring to the estimated danger information and its corresponding GT danger information, and to perform backpropagation by using the danger loss, to thereby train at least part of parameters of the fifth neural network 170. Herein, the GT danger information may have been generated by referring to information on whether an accident occurred to the subject vehicle or surroundings of the subject vehicle at the (T+1)-th timing, if the circumstance image and the circumstance communication information correspond to the T-th timing before the (T+1)-th timing.

As another example embodiment, different from the above example embodiment, the first to the fifth neural networks 130 to 170 may be trained at once. That is, the learning device 100, if the estimated surrounding motion information generated by the untrained fourth neural network 160 is acquired, may instruct the fifth neural network 170 to apply the fifth neural network operation to the estimated surrounding motion information, to thereby generate the estimated danger information. Saying again, the estimated surrounding motion information used in this example embodiment may be generated at the middle of the training processes of the first to the fourth neural networks 130 to 160, not after the completion of those. Thereafter, the learning device 100 may instruct a loss layer to generate a loss by referring to the estimated danger information and its corresponding GT danger information, and to perform backpropagation by using the loss, to thereby train at least part of the parameters of the fifth neural network 170.

After the first to the fifth neural networks 130 to 170 are trained, those may be used for performing a test method of the present disclosure. Hereinafter, such a test method will be explained by referring to FIG. 5.

Figure 5:
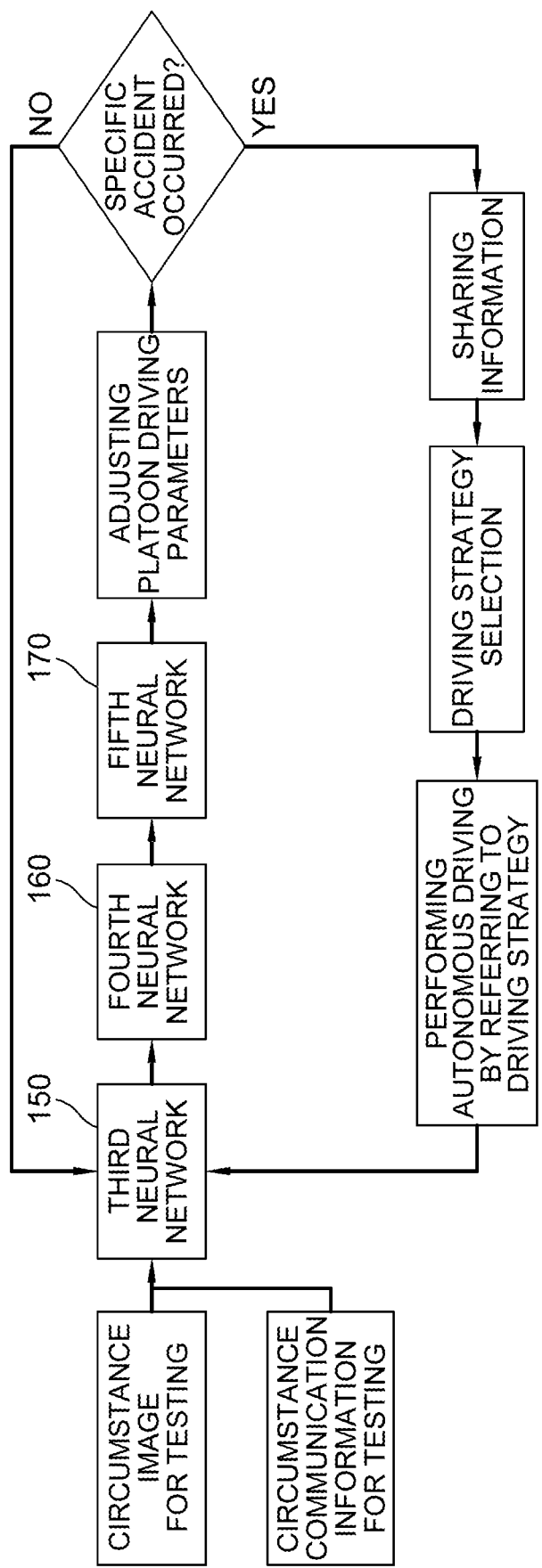
FIG. 5 is a flow chart schematically illustrating a testing method for supporting the safer autonomous driving without the danger of the accident by estimating the motions of the surrounding objects through the fusion of the information from the multiple sources in accordance with one example embodiment of the present disclosure.

FIG. 5 is a flow chart schematically illustrating the testing method for supporting the safer autonomous driving without the danger of the accident by estimating the motions of the surrounding objects through the fusion of the information from the multiple sources in accordance with one example embodiment of the present disclosure.

By referring to FIG. 5, first, on condition that (1) the learning device 100 has performed a process of instructing, if at least one circumstance image for training is acquired through at least one camera for training on a subject vehicle for training, the first neural network 130 to apply the first neural network operation to the circumstance image for training, to thereby generate at least one image-based feature map for training corresponding to the circumstance image for training, and a process of instructing, if circumstance communication information for training is acquired through at least one communication module for training on the subject vehicle for training, the second neural network 140 to apply the second neural network operation to the circumstance communication information for training, to thereby generate at least one communication-based feature map for training corresponding to the circumstance communication information for training, (2) the learning device 100 has instructed the third neural network 150 to apply the third neural network operation to the image-based feature map for training and the communication-based feature map for training, to thereby generate an integrated feature map for training, (3) the learning device 100 has instructed the fourth neural network 160 to apply the fourth neural network operation to the integrated feature map for training, to thereby generate estimated surrounding motion information for training which represents estimated motions of one or more surrounding objects for training during a specific time range, and (4) the learning device 100 has instructed the first loss layer 180 to generate at least one motion loss by referring to the estimated surrounding motion information for training and its corresponding Ground-Truth (GT) surrounding motion information, and to perform backpropagation by using the motion loss, to thereby train at least part of parameters of the first to the fourth neural networks 130 to 160; a testing device may perform a process of instructing, if at least one circumstance image for testing is acquired through at least one camera for testing on a subject vehicle for testing, the first neural network 130 to apply the first neural network operation to the circumstance image for testing, to thereby generate at least one image-based feature map for testing corresponding to the circumstance image for testing, and a process of instructing, if circumstance communication information for testing is acquired through at least one communication module for testing on the subject vehicle for testing, the second neural network 140 to apply the second neural network operation to the circumstance communication information for testing, to thereby generate at least one communication-based feature map for testing corresponding to the circumstance communication information for testing.

Also, the testing device may instruct the third neural network 150 to apply the third neural network operation to the image-based feature map for testing and the communication-based feature map for testing, to thereby generate an integrated feature map for testing.

Thereafter, the testing device may instruct the fourth neural network 160 to apply the fourth neural network operation to the integrated feature map for testing, to thereby generate estimated surrounding motion information for testing which represents estimated motions of one or more surrounding objects for testing during the specific time range.

Then, the testing device may instruct the fifth neural network 170 which has been trained by using the first to the fourth neural networks 130 to 160 to apply the fifth neural network operation to the estimated surrounding motion information for testing, to thereby generate estimated danger information for testing including information on a probability of an accident, occurring during the specific time range, whose correlation score with the subject vehicle for testing is larger than the second threshold.

After the estimated danger information for testing is generated, the testing device, if the subject vehicle for testing is performing the autonomous driving through a platoon driving, may adjust platoon driving parameters by referring to the estimated danger information for testing. For example, if the estimated danger information for testing indicates that the probability of an accident around the subject vehicle for testing is larger than a third threshold, the platoon driving parameters may be adjusted to make overall speed of a platoon slower, in order to prepare for the accident. Otherwise, if the estimated danger information for testing indicates that the probability of the accident around the subject vehicle for testing is smaller than the third threshold, the platoon driving parameters may be adjusted to make overall speed of a platoon faster, or to make a formation of the platoon more speed-oriented, for efficiency.

Separately from the above processes, the testing device 100 may detect accidents therearound, and may share information thereon with the surrounding objects for testing. Specifically, the testing device, if a specific accident whose correlation score with the subject vehicle for testing is larger than the second threshold actually occurs and is detected, may share information on the specific accident with the surrounding objects for testing, and may support the subject vehicle for testing to perform the autonomous driving by referring to a driving strategy for avoiding a hazardous situation to be occurred by the specific accident. As one example, if the subject vehicle for testing was performing the platoon driving, the testing device may temporarily stop the platoon driving, dismiss the platoon, and support the subject vehicle for testing to avoid the specific accident, by speeding up the subject vehicle for testing if the specific accident occurred at the back thereof, or speeding down the subject vehicle for testing if the specific accident occurred at the front thereof.

The present disclosure has an effect of allowing autonomous vehicles to react properly when they meet at least one accident during vehicle platooning.

The present disclosure has another effect of allowing the autonomous vehicles to avoid one or more surrounding objects with high accident hazard.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for supporting a safer autonomous driving, avoiding dangers of accidents, by estimating one or more motions of one or more surrounding objects using a fusion of each of pieces of information acquired through images and communications, comprising steps of:

(a) a learning device performing a process of instructing, if at least one circumstance image is acquired through at least one camera on a subject vehicle, a first neural network to apply at least one first neural network operation to the circumstance image, to thereby generate at least one image-based feature map corresponding to the circumstance image, and a process of instructing, if circumstance communication information is acquired through at least one communication module on the subject vehicle, a second neural network to apply at least one second neural network operation to the circumstance communication information, to thereby generate at least one communication-based feature map corresponding to the circumstance communication information;

(b) the learning device instructing a third neural network to apply at least one third neural network operation to the image-based feature map and the communication-based feature map, to thereby generate an integrated feature map;

(c) the learning device instructing a fourth neural network to apply at least one fourth neural network operation to the integrated feature map, to thereby generate estimated surrounding motion information which represents estimated motions of the surrounding objects during a specific time range; and (d) the learning device instructing a first loss layer to generate at least one motion loss by referring to the estimated surrounding motion information and its corresponding Ground-Truth (GT) surrounding motion information, and to perform backpropagation by using the motion loss, to thereby train at least part of parameters of the first to the fourth neural networks.

2. The method of claim 1, wherein, at the step of (a), the learning device (i) instructs at least one second Fully-Connected (FC) layer in the second neural network to apply at least one second FC operation to the circumstance communication information including communication-based meta data on each of the surrounding objects located closer than a threshold from the subject vehicle as its one or more communication-based meta data vectors, to thereby generate communication-based meta feature vectors corresponding to the communication-based meta data vectors, and (ii) instructs at least one second pooling layer therein to apply at least one second pooling operation to the communication-based meta feature vectors, to thereby generate the communication-based feature map.

3. The method of claim 1, wherein, at the step of (c), the learning device instructs the fourth neural network to apply the fourth neural network operation to (i) the integrated feature map corresponding to global information acquired through the camera and the communication module and (ii) a meta feature map, corresponding to local information on each of the surrounding objects, including one or more communication-based meta feature vectors which have been used for generating the communication-based feature map, to thereby generate the estimated surrounding motion information.

4. The method of claim 3, wherein, at the step of (c), the learning device generates the meta feature map by referring to the communication-based meta feature vectors and one or more image-based meta feature vectors corresponding to image-based meta data on the surrounding objects acquired through the camera.

5. The method of claim 1, wherein, at the step of (b), the learning device generates a temporary feature map by channel-wise concatenating the communication-based feature map and the image-based feature map, and instructs the third neural network, built as a Recurrent Neural Network (RNN), to apply the third neural network operation to the temporary feature map by using a state vector corresponding to its previously inputted information, to thereby generate the integrated feature map.

6. The method of claim 5, wherein the third neural network is built as a Long-Short Term Memory (LSTM) network which is one kind of the RNN.

7. The method of claim 1, wherein the learning device instructs the first loss layer to generate the motion loss by referring to (i) the GT surrounding motion information acquired by referring to location information and velocity information of the surrounding objects at a (T+1)-th timing, if the circumstance image and the circumstance communication information correspond to a T-th timing before the (T+1)-th timing, and (ii) the estimated surrounding motion information.

8. The method of claim 1, further comprising steps of:
(e) the learning device, on condition that the first to the fourth neural networks have been trained, instructing a fifth neural network to apply at least one fifth neural network operation to estimated surrounding motion information outputted from the trained fourth neural network, to thereby generate estimated danger information including information on a probability of an accident, occurring during the specific time range, whose correlation score with the subject vehicle is larger than a threshold; and
(f) the learning device instructing a second loss layer to generate at least one danger loss by referring to the estimated danger information and its corresponding GT danger information, and to perform backpropagation by using the danger loss, to thereby train at least part of parameters of the fifth neural network.

9. The method of claim 1, wherein, at the step of (a), the learning device instructs a first convolutional layer in the first neural network to apply at least one first convolutional operation to the circumstance image, to thereby generate at least one first feature map, instructs a first pooling layer therein to apply at least one first pooling operation to the first feature map, to thereby generate at least one first pooled feature map, and instructs a first FC layer therein to apply at least one first FC operation to the first pooled feature map, to thereby generate the image-based feature map.

10. A testing method for supporting a safer autonomous driving, avoiding dangers of accidents, by estimating one or more motions of one or more surrounding objects for testing using a fusion of each of pieces of information acquired through images and communications, comprising steps of:
(a) on condition that (1) a learning device has performed a process of instructing, if at least one circumstance image for training is acquired through at least one camera for training on a subject vehicle for training, a first neural network to apply at least one first neural network operation to the circumstance image for training, to thereby generate at least one image-based feature map for training corresponding to the circumstance image for training, and a process of instructing, if circumstance communication information for training is acquired through at least one communication module for training on the subject vehicle for training, a second neural network to apply at least one second neural network operation to the circumstance communication information for training, to thereby generate at least one communication-based feature map for training corresponding to the circumstance communication information for training; (2) the learning device has instructed a third neural network to apply at least one third neural network operation to the image-based feature map for training and the communication-based feature map for training, to thereby generate an integrated feature map for training; (3) the learning device has instructed a fourth neural network to apply at least one fourth neural network operation to the integrated feature map for training, to thereby generate estimated surrounding motion information for training which represents estimated motions of one or more surrounding objects for training during a specific time range; and (4) the learning device has instructed a first loss layer to generate at least one motion loss by referring to the estimated surrounding motion information for training and its corresponding Ground-Truth (GT) surrounding motion information, and to perform backpropagation by using the motion loss, to thereby train at least part of parameters of the first to the fourth neural networks, a testing device performing a process of instructing, if at least one circumstance image for testing is acquired through at least one camera for testing on a subject vehicle for testing, the first neural network to apply the first neural network operation to the circumstance image for testing, to thereby generate at least one image-based feature map for testing corresponding to the circumstance image for testing, and a process of instructing, if circumstance communication information for testing is acquired through at least one communication module for testing on the subject vehicle for testing, the second neural network to apply the second neural network operation to the circumstance communication information for testing, to thereby generate at least one communication-based feature map for testing corresponding to the circumstance communication information for testing;
(b) the testing device instructing the third neural network to apply the third neural network operation to the image-based feature map for testing and the communication-based feature map for testing, to thereby generate an integrated feature map for testing;
(c) the testing device instructing the fourth neural network to apply the fourth neural network operation to the integrated feature map for testing, to thereby generate estimated surrounding motion information for testing which represents estimated motions of the surrounding objects for testing during the specific time range.

11. The method of claim 10, further comprising a step of:
(d) the testing device instructing a fifth neural network which has been trained by using the first to the fourth neural networks to apply at least one fifth neural network operation to the estimated surrounding motion information for testing, to thereby generate estimated danger information for testing including information on a probability of an accident, occurring during the specific time range, whose correlation score with the subject vehicle for testing is larger than a threshold.

12. The method of claim 11, further comprising a step of:
(e) the testing device, if the subject vehicle for testing is performing the autonomous driving through a platoon driving, adjusting platoon driving parameters by referring to the estimated danger information for testing.

13. The method of claim 12, wherein the testing device, if a specific accident whose correlation score with the subject vehicle for testing is larger than the threshold actually occurs and is detected, shares information on the specific accident with the surrounding objects for testing, and supports the subject vehicle for testing to perform the autonomous driving by referring to a driving strategy for avoiding a hazardous situation to be occurred by the specific accident.

14. The method of claim 10, wherein, at the step of (c), the testing device instructs the fourth neural network to apply the fourth neural network operation to (i) the integrated feature map for testing corresponding to global information for testing acquired through the camera for testing and the communication module for testing and (ii) a meta feature map for testing, corresponding to local information for testing on each of the surrounding objects for testing, including one or more communication-based meta feature vectors for testing which have been used for generating the communication-based feature map for testing, to thereby generate the estimated surrounding motion information for testing.

15. The method of claim 14, wherein, at the step of (c), the testing device generates the meta feature map for testing by referring to the communication-based meta feature vectors for testing and one or more image-based meta feature vectors for testing corresponding to image-based meta data for testing on the surrounding objects for testing acquired through the camera for testing.

16. A learning device for supporting a safer autonomous driving, avoiding dangers of accidents, by estimating one or more motions of one or more surrounding objects using a fusion of each of pieces of information acquired through images and communications, comprising:

at least one memory that stores instructions; and
at least one processor configured to execute the instructions to perform processes of: (I) instructing, if at least one circumstance image is acquired through at least one camera on a subject vehicle, a first neural network to apply at least one first neural network operation to the circumstance image, to thereby generate at least one image-based feature map corresponding to the circumstance image, and instructing, if circumstance communication information is acquired through at least one communication module on the subject vehicle, a second neural network to apply at least one second neural network operation to the circumstance communication information, to thereby generate at least one communication-based feature map corresponding to the circumstance communication information; (II) instructing a third neural network to apply at least one third neural network operation to the image-based feature map and the communication-based feature map, to thereby generate an integrated feature map; (III) instructing a fourth neural network to apply at least one fourth neural network operation to the integrated feature map, to thereby generate estimated surrounding motion information which represents estimated motions of the surrounding objects during a specific time range; and (IV) instructing a first loss layer to generate at least one motion loss by referring to the estimated surrounding motion information and its corresponding Ground-Truth (GT) surrounding motion information, and to perform backpropagation by using the motion loss, to thereby train at least part of parameters of the first to the fourth neural networks.

17. The device of claim 16, wherein, at the process of (I), the processor (i) instructs at least one second Fully-Connected (FC) layer in the second neural network to apply at least one second FC operation to the circumstance communication information including communication-based meta data on each of the surrounding objects located closer than a threshold from the subject vehicle as its one or more communication-based meta data vectors, to thereby generate communication-based meta feature vectors corresponding to the communication-based meta data vectors, and (ii) instructs at least one second pooling layer therein to apply at least one second pooling operation to the communication-based meta feature vectors, to thereby generate the communication-based feature map.

18. The device of claim 16, wherein, at the process of (III), the processor instructs the fourth neural network to apply the fourth neural network operation to (i) the integrated feature map corresponding to global information acquired through the camera and the communication module and (ii) a meta feature map, corresponding to local information on each of the surrounding objects, including one or more communication-based meta feature vectors which have been used for generating the communication-based feature map, to thereby generate the estimated surrounding motion information.

19. The device of claim 18, wherein, at the process of (III), the processor generates the meta feature map by referring to the communication-based meta feature vectors and one or more image-based meta feature vectors corresponding to image-based meta data on the surrounding objects acquired through the camera.

20. The device of claim 16, wherein, at the process of (II), the processor generates a temporary feature map by channel-wise concatenating the communication-based feature map and the image-based feature map, and instructs the third neural network, built as a Recurrent Neural Network (RNN), to apply the third neural network operation to the temporary feature map by using a state vector corresponding to its previously inputted information, to thereby generate the integrated feature map.

21. The device of claim 20, wherein the third neural network is built as a Long-Short Term Memory (LSTM) network which is one kind of the RNN.

22. The device of claim 16, wherein the processor instructs the first loss layer to generate the motion loss by referring to (i) the GT surrounding motion information acquired by referring to location information and velocity information of the surrounding objects at a (T+1)-th timing, if the circumstance image and the circumstance communication information correspond to a T-th timing before the (T+1)-th timing, and (ii) the estimated surrounding motion information.

23. The device of claim 16, wherein the processor further performs processes of (V) on condition that the first to the fourth neural networks have been trained, instructing a fifth neural network to apply at least one fifth neural network operation to estimated surrounding motion information outputted from the trained fourth neural network, to thereby generate estimated danger information including information on a probability of an accident, occurring during the specific time range, whose correlation score with the subject vehicle is larger than a threshold, and (VI) instructing a second loss layer to generate at least one danger loss by referring to the estimated danger information and its corresponding GT danger information, and to perform backpropagation by using the danger loss, to thereby train at least part of parameters of the fifth neural network.

24. The device of claim 16, wherein, at the process of (I), the processor instructs a first convolutional layer in the first neural network to apply at least one first convolutional operation to the circumstance image, to thereby generate at least one first feature map, instructs a first pooling layer therein to apply at least one first pooling operation to the first feature map, to thereby generate at least one first pooled feature map, and instructs a first FC layer therein to apply at least one first FC operation to the first pooled feature map, to thereby generate the image-based feature map.

25. A testing device for supporting a safer autonomous driving, avoiding dangers of accidents, by estimating one or more motions of one or more surrounding objects for testing using a fusion of each of pieces of information acquired through images and communications, comprising:
at least one memory that stores instructions; and
at least one processor configured to execute the instructions to perform processes of: (I) on condition that (1) a learning device has performed a process of instructing, if at least one circumstance image for training is acquired through at least one camera for training on a subject vehicle for training, a first neural network to apply at least one first neural network operation to the circumstance image for training, to thereby generate at least one image-based feature map for training corresponding to the circumstance image for training, and a process of instructing, if circumstance communication information for training is acquired through at least one communication module for training on the subject vehicle for training, a second neural network to apply at least one second neural network operation to the circumstance communication information for training, to thereby generate at least one communication-based feature map for training corresponding to the circumstance communication information for training; (2) the learning device has instructed a third neural network to apply at least one third neural network operation to the image-based feature map for training and the communication-based feature map for training, to thereby generate an integrated feature map for training; (3) the learning device has instructed a fourth neural network to apply at least one fourth neural network operation to the integrated feature map for training, to thereby generate estimated surrounding motion information for training which represents estimated motions of one or more surrounding objects for training during a specific time range; and (4) the learning device has instructed a first loss layer to generate at least one motion loss by referring to the estimated surrounding motion information for training and its corresponding Ground-Truth (GT) surrounding motion information, and to perform backpropagation by using the motion loss, to thereby train at least part of parameters of the first to the fourth neural networks, performing a process of instructing, if at least one circumstance image for testing is acquired through at least one camera for testing on a subject vehicle for testing, the first neural network to apply the first neural network operation to the circumstance image for testing, to thereby generate at least one image-based feature map for testing corresponding to the circumstance image for testing, and a process of instructing, if circumstance communication information for testing is acquired through at least one communication module for testing on the subject vehicle for testing, the second neural network to apply the second neural network operation to the circumstance communication information for testing, to thereby generate at least one communication-based feature map for testing corresponding to the circumstance communication information for testing; (II) instructing the third neural network to apply the third neural network operation to the image-based feature map for testing and the communication-based feature map for testing, to thereby generate an integrated feature map for testing; (III) instructing the fourth neural network to apply the fourth neural network operation to the integrated feature map for testing, to thereby generate estimated surrounding motion information for testing which represents estimated motions of the surrounding objects for testing during the specific time range.

26. The device of claim 25, wherein the processor further performs a process of (IV) instructing a fifth neural network which has been trained by using the first to the fourth neural networks to apply at least one fifth neural network operation to the estimated surrounding motion information for testing, to thereby generate estimated danger information for testing including information on a probability of an accident, occurring during the specific time range, whose correlation score with the subject vehicle for testing is larger than a threshold.

27. The device of claim 26, wherein the processor further performs a process of (V) if the subject vehicle for testing is performing the autonomous driving through a platoon driving, adjusting platoon driving parameters by referring to the estimated danger information for testing.

28. The device of claim 27, wherein the processor, if a specific accident whose correlation score with the subject vehicle for testing is larger than the threshold actually occurs and is detected, shares information on the specific accident with the surrounding objects for testing, and supports the subject vehicle for testing to perform the autonomous driving by referring to a driving strategy for avoiding a hazardous situation to be occurred by the specific accident.

29. The device of claim 25, wherein, at the process of (III), the processor instructs the fourth neural network to apply the fourth neural network operation to (i) the integrated feature map for testing corresponding to global information for testing acquired through the camera for testing and the communication module for testing and (ii) a meta feature map, for testing corresponding to local information for testing on each of the surrounding objects for testing, including one or more communication-based meta feature vectors for testing which have been used for generating the communication-based feature map for testing, to thereby generate the estimated surrounding motion information for testing.

30. The device of claim 29, wherein, at the process of (III), the processor generates the meta feature map for testing by referring to the communication-based meta feature vectors for testing and one or more image-based meta feature vectors for testing corresponding to image-based meta data for testing on the surrounding objects for testing acquired through the camera for testing.

* * * * *